United States Patent
Verrat-Debailleul et al.

(10) Patent No.: US 9,946,011 B2
(45) Date of Patent: Apr. 17, 2018

(54) ILLUMINATED GLAZING WITH PRINTED LAMINATION INSERT

(71) Applicant: SAINT-GOBAIN GLASS FRANCE, Courbevoie (FR)

(72) Inventors: Adèle Verrat-Debailleul, Villers-sur-Coudun (FR); Mathieu Berard, Paris (FR); Jean-Philippe Mulet, Montreuil (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 117 days.

(21) Appl. No.: 14/425,566

(22) PCT Filed: Aug. 9, 2013

(86) PCT No.: PCT/FR2013/051918
§ 371 (c)(1),
(2) Date: Mar. 3, 2015

(87) PCT Pub. No.: WO2014/037643
PCT Pub. Date: Mar. 13, 2014

(65) Prior Publication Data
US 2015/0247968 A1    Sep. 3, 2015

(30) Foreign Application Priority Data

Sep. 4, 2012  (FR) .................................. 12 58226

(51) Int. Cl.
*F21V 7/04* (2006.01)
*F21V 8/00* (2006.01)
(Continued)

(52) U.S. Cl.
CPC ...... *G02B 6/0088* (2013.01); *B32B 17/10036* (2013.01); *B32B 17/10174* (2013.01);
(Continued)

(58) Field of Classification Search
CPC .......... F21V 2008/006; F21W 2101/08; B32B 17/10761; B32B 17/10541;
(Continued)

(56) References Cited

U.S. PATENT DOCUMENTS

| 8,829,539 B2 * | 9/2014 | Kleo ................. B32B 17/10018 257/82 |
| 2013/0044511 A1 * | 2/2013 | Motooka .............. G02B 6/0013 362/606 |

FOREIGN PATENT DOCUMENTS

| DE | 102 04 359 A1 | 10/2002 |
| FR | 2 928 929 A1 | 9/2009 |

(Continued)

OTHER PUBLICATIONS

International Search Report issued for International Patent Application No. PCT/FR2013/051918, dated Nov. 25, 2013.

*Primary Examiner* — Bao Q Truong
*Assistant Examiner* — Matthew Peerce
(74) *Attorney, Agent, or Firm* — Pillsbury Winthrop Shaw Pittman LLP

(57) ABSTRACT

A laminated illuminating glazing unit includes a first sheet with a first main face, a second main face and an edge face, a second sheet with a first main face, a second main face and an edge face; a transparent lamination interlayer making adhesive contact with the second main face of the first sheet and with the first main face of the second sheet; a strip of light-emitting diodes (LEDs), including a printed circuit board and a plurality of LEDs, positioned so that the emitting faces of the LEDs face the edge face of the first sheet; and one or more scattering elements, wherein the lamination interlayer includes, on at least one of its main faces, an opaque masking layer extending from the edge of the interlayer toward the center of the glazing unit so as to cover a zone in which the light from the LEDs would, in the (Continued)

absence of the opaque masking layer, be visible, in the form of luminous halos, through the second sheet.

19 Claims, 2 Drawing Sheets

(51) Int. Cl.
*B32B 17/10* (2006.01)
*B60Q 1/26* (2006.01)
*F21V 19/00* (2006.01)
*B60Q 3/64* (2017.01)
*B60Q 3/208* (2017.01)
*F21Y 103/10* (2016.01)
*F21Y 115/10* (2016.01)

(52) U.S. Cl.
CPC .. *B32B 17/10541* (2013.01); *B32B 17/10761* (2013.01); *B60Q 1/268* (2013.01); *B60Q 3/208* (2017.02); *B60Q 3/64* (2017.02); *F21V 19/0045* (2013.01); *G02B 6/0041* (2013.01); *G02B 6/0043* (2013.01); *G02B 6/0055* (2013.01); *G02B 6/0068* (2013.01); *G02B 6/0073* (2013.01); *G02B 6/0076* (2013.01); *F21Y 2103/10* (2016.08); *F21Y 2115/10* (2016.08); *G02B 6/002* (2013.01); *G02B 6/0023* (2013.01)

(58) Field of Classification Search
CPC ........ B32B 17/10036; B32B 17/10293; B32B 17/10275; F21S 48/2268; F21S 48/238; F21S 48/25
USPC ........................................................ 362/612
See application file for complete search history.

(56) References Cited

FOREIGN PATENT DOCUMENTS

| | | |
|---|---|---|
| FR | 2 974 103 A1 | 10/2012 |
| WO | WO 01/90787 A1 | 11/2001 |
| WO | WO 2011/092419 A1 | 8/2011 |

* cited by examiner

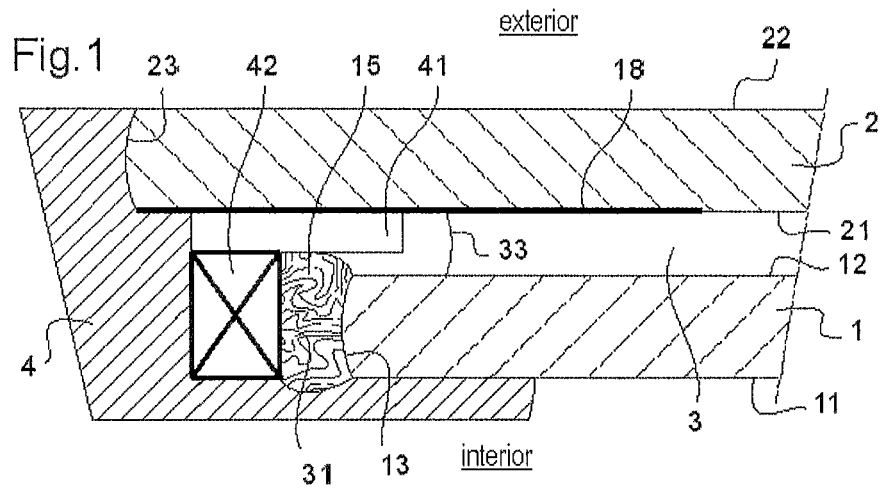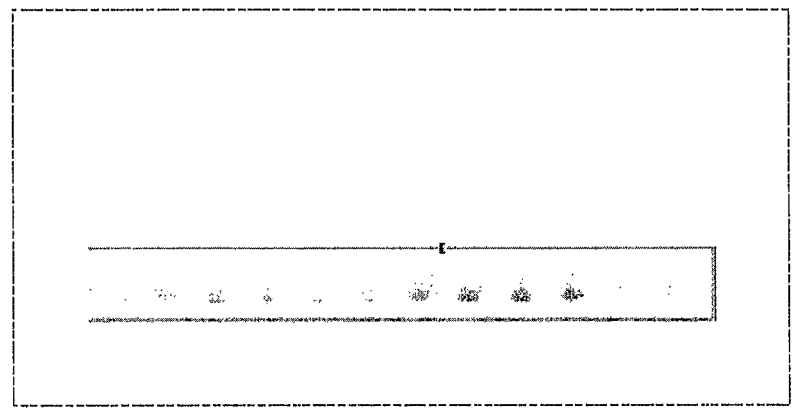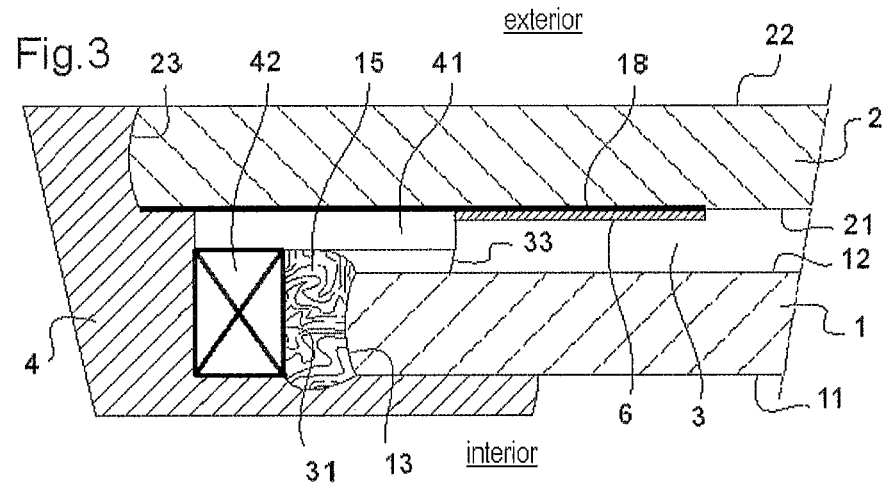

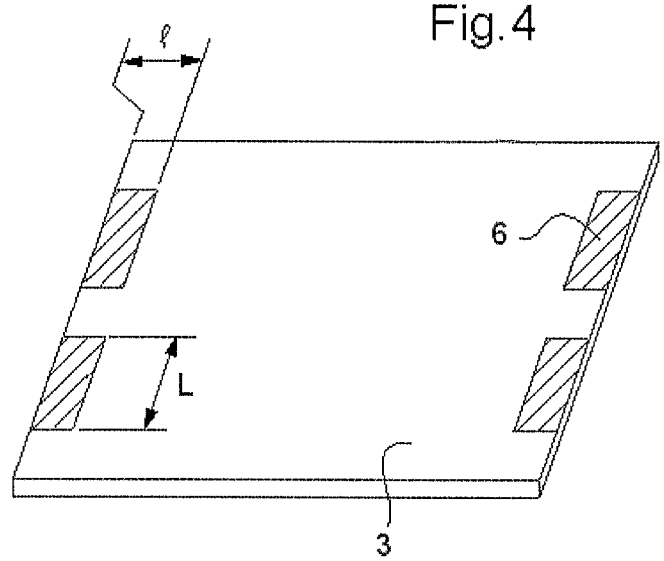
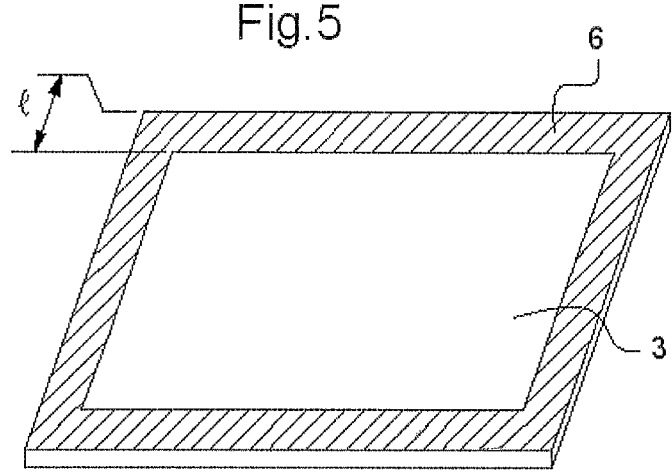

ILLUMINATED GLAZING WITH PRINTED LAMINATION INSERT

CROSS-REFERENCE TO RELATED APPLICATIONS

This application is the U.S. National Stage of PCT/FR2013/051918, filed Aug. 9, 2013, which in turn claims priority to French Application No. 1258226, filed Sep. 4, 2012. The contents of all of these applications are incorporated herein by reference in their entirety.

The present invention relates to a laminated glazing unit, preferably an automotive glazing unit, illuminated via its edge face by means of light-emitting diodes and comprising a rather simple system for effectively masking parasitic light produced by these diodes.

Glazing units, and in particular automotive vehicle glazing units, illuminated via their edge face by means of light-emitting diodes (LEDs) are known. In the case of laminated glazing units, these LEDs inject light into at least one of the two glass sheets, which then functions as a waveguide, guiding the light as far as a means for extracting the light (scattering element) located a certain distance from the edge of the glazing unit.

The light intensity emitted by the Lambertian emitting face of the LED is generally very high and the light is emitted therefrom over about 180°. For esthetic reasons, it is generally desired to mask the LEDs in order to hide them from the sight of people nearby. There are various means for blocking this direct light from the LEDs (called parasitic light below):

- the encapsulating means, which is generally formed from an opaque polymer (polyurethane filled with carbon black), may cover the edge of the glazing unit and, providing it is sufficiently thick, effectively block the parasitic light; however, this means is not available for what are called "flush mount" glazing units where the encapsulation covers the edge face of the sheet but does not extend beyond it;
- a masking enamel may be applied either to the border of the illuminated sheet, or to the border of the unilluminated sheet which is adhesively bonded to the illuminated sheet via the transparent lamination interlayer (see for example WO 2011/092419 in the name of the Applicant); however, the thickness of such an enamel is limited to a few microns, which is often insufficient for effective masking;
- lastly, the printed circuit board on which the LEDs are mounted may screen the light; its blocking power and/or its extent are however generally insufficient to perfectly mask the parasitic light.

FIG. 1, described in more detail below, shows a laminated flush mount glazing unit according to the prior art, in which the parasitic light is blocked on the interior side by the encapsulating element and toward the exterior by an insufficiently opaque masking enamel. As a result, residual spots of light are visible from the exterior, as shown in FIG. 2.

The present invention is based on the idea of masking the parasitic light with a thin opaque printed layer located on the border of the lamination interlayer and, after lamination, in immediate proximity to the LED strips, level with the zone in which the luminous halos of the parasitic light appear in the absence of this layer.

More precisely, the subject of the present invention is a laminated illuminating glazing unit, comprising:
(a) a first sheet, made of mineral or organic glass, with a first main face, a second main face and an edge face;
(b) a second sheet, made of mineral or organic glass, with a first main face, a second main face and an edge face;
(c) a transparent lamination interlayer making adhesive contact with the second main face of the first sheet and with the first main face of the second sheet;
(d) at least one strip of light-emitting diodes (LEDs), comprising a printed circuit board (PCB) and a plurality of LEDs, positioned so that the emitting faces of the LEDs face the edge face of the first sheet; and
(e) one or more scattering elements preferably located on one of the main faces of the first sheet or in the thickness of the first sheet, the lamination interlayer (c) comprising, on at least one of its main faces, an opaque masking layer extending from the edge of the interlayer toward the center of the glazing unit so as to cover a zone in which the light from the LEDs would, in the absence of said opaque masking layer, be visible, in the form of luminous halos, through the second sheet.

The glazing unit of the present invention is a laminated glazing unit comprising at least two single sheets adhesively bonded to each other in a known way by means of the lamination interlayer. It is important to note that, in the description below of the glazing unit, the term "first sheet" will always denote the glass sheet illuminated via its edge face by the one or more light sources. The first sheet or illuminated sheet is preferably that making contact with the interior of the vehicle or building. The second glass sheet is therefore preferably that making contact with the exterior of the vehicle or building.

Each of the two sheets of the glazing unit of the present invention has an edge face and two main faces. The face intended to be oriented toward the interior of the passenger compartment or of the building will be called the first main face, and the face that will be directed towards the exterior of the building or of the passenger compartment of the vehicle will be called the second main face.

In the present invention, the expression "opaque layer" is understood to mean a layer with an optical density at least equal to 2.

The opaque masking layer is a layer printed using any appropriate technique, preferably screen printing. It is preferably black or gray, but could also be colored; however, it is not advantageous to make this layer a particular color as it will, in principle, not be possible to see it after the interlayer has been incorporated into the glazing unit.

The opaque layer takes the form of one or more, generally rectangular, elongate bands extending along the edge of the lamination interlayer. It is essential for said masking band to extend as far as the edge of the interlayer and closely follow the shape of this edge. In other words, the edge of the interlayer must strictly superpose on one of the edges of the masking band (see FIG. 4), at least in the zone in which the parasitic light is to be masked.

The length of the masking band may be shorter than that of the edge of the interlayer. It may especially be similar to that of the LED strip in proximity with which it will be placed in the final glazing unit, and for example comprised between 5 and 80 cm, preferably between 10 and 50 cm, and in particular between 15 and 40 cm. The masking band may however be the same length as the edge of the glazing unit.

The interlayer may comprise one or more opaque bands and, lastly, the masking band may take the form of a continuous frame occupying the entire periphery of the interlayer (see FIG. 5).

The band must be sufficiently wide to block all the parasitic light, but must be sufficiently narrow to remain invisible from the interior or exterior of the vehicle once the glazing unit has been fitted. The width of each masking band is generally comprised between 0.5 and 5 cm, preferably between 0.8 and 4 cm, and in particular between 1 and 3 cm.

The opaque masking layer may be a layer that absorbs light, a layer that reflects light, or a layer that both absorbs some of the light and reflects some of the light.

An opaque layer that reflects light is preferably a metal layer, for example a silver layer.

Screen-printing compositions and processes for printing black, colored or reflective opaque layers are described, for example, in patent applications FR 2 928 929 and FR 2 974 103 in the name of the Applicant.

The lamination interlayer may be made of any transparent polymer widely used for this purpose, for example it may be made of polyvinyl butyral (PVB), of thermoplastic polyurethane (TPU), or of ethylene vinyl acetate copolymer (EVA). PVB is particularly preferred.

The opaque masking layer may be applied to one of the two faces of the interlayer, or even to both faces. In a preferred embodiment, it is applied to that main face of the lamination interlayer which makes adhesive contact with the first main face of the second sheet. In this embodiment, the interlayer may advantageously comprise, on the other main face—i.e. on that making contact with the second face of the first sheet—a thin reflective layer, which does not need to be opaque, and the extent of which is little different to that of the opaque layer. A large part of the parasitic light emitted by the LEDs is thus reflected by this reflective layer and "reinjected" into the first sheet. The light that passes through this layer is absorbed or reflected by the opaque masking layer printed on the other face of the interlayer.

The second glass sheet is preferably larger than the first and extends beyond the latter at least on the edge of the glazing unit where the one or more strips of LEDs are located. The one or more LED strips are then fixed, by way of the PCB, to the first main face of the second sheet in the zone where the latter extends beyond the first sheet, one edge of the PCB preferably making contact with the edge face of the lamination interlayer.

Specifically, the PCB is made of a relatively opaque material and plays, like the opaque layer printed on the edge of the interlayer, a role in screening the parasitic light. Contact between the edge of the PCB and the edge of the lamination interlayer thus ensures the continuity of the opacity. If the PCB did not make contact with the interlayer, the slit thus left between the two could undesirably let light from the LEDs pass through.

The lamination interlayer bearing the opaque layer preferably has a smaller extent than that of each of the glass sheets. A groove-shaped space is thus created between the edge of the second main face of the first sheet and the edge of the first main face of the second sheet. For the reasons given in the above paragraph, the PCB is then inserted into this space, bearing against the first main face of the second glass sheet, and makes contact, via one of its edges, with the edge face of the lamination interlayer.

The scattering elements are for example formed by a thin layer of particles having an average size comprised between about 50 nm and 1 µm, these particles being fixed to the first sheet by means of a mineral or organic binder.

The particles may be mineral particles, for example based on metal oxides, carbides or nitrides. Mention may be made, by way of example of preferred particles, of particles of silica, alumina, zirconia, titanium oxide, and cerium oxide.

Such scattering layers are for example described in international patent application WO 01/90787.

In a preferred embodiment of the glazing unit of the present invention, the second sheet comprises, on its first main face, i.e. on that face which makes contact with the lamination interlayer, an opaque enamel layer extending from the edge of the second sheet toward the center of the glazing unit, preferably at least as far as the limit of the opaque masking layer on the lamination interlayer making contact with the first main face of the second sheet. Thus, the enamel layer "doubles" the masking layer printed on the interlayer.

An encapsulating element is generally overmolded onto at least part, and preferably all, of the periphery of the laminated glazing unit of the present invention. This element is formed in a known way, preferably by reaction-injection molding (RIM) of monomers that join to form reticulated thermoset polymers. The most commonly used type of polymer is polyurethane.

This encapsulating element makes contact at least with the edge face of the second sheet and with the first main face of the first sheet. That part of the encapsulating element which extends over the first main face of the first sheet has an anti-parasitic-light function. It must be wide enough to prevent the LEDs from being seen directly from the interior of the vehicle.

Using a lamination interlayer printed, on its edge, with an opaque layer taking the form of one or more bands thus allows the problem of parasitic light to be solved without increasing the complexity of the lamination process. To the knowledge of the Applicant such a lamination interlayer printed on its edge with one or more opaque bands has not been described up to now. Another subject of the present invention is therefore a lamination interlayer for manufacturing a laminated glazing unit such as described above, this interlayer consisting of a polyvinyl butyral sheet comprising, on at least one of its main faces, an opaque masking layer taking the form of one or more bands extending from the edge of the interlayer towards the center, said bands having a width comprised between 0.5 and 5 cm, and covering in total 2 to 25%, preferably 4 to 15%, and in particular 5 to 10%, of the face of the lamination interlayer.

In one particular embodiment, the opaque masking layer is a single continuous frame-type band covering the entire periphery of at least one of the main faces of the interlayer.

The present invention is now illustrated using a few embodiments shown in the figures below, in which:

FIG. 1 shows a transverse cross section of the edge of a prior-art LED-illuminated laminated glazing unit;

FIG. 2 is the negative of a photograph taken with a video photometer showing the residual light spots (parasitic light) observed for the glazing unit in FIG. 1;

FIG. 3 shows a transverse cross section of the edge of a first embodiment of a glazing unit according to the invention;

FIG. 4 shows a perspective view of a first embodiment of a lamination interlayer according to the invention; and FIG. 5 shows a perspective view of a second embodiment of a lamination interlayer according to the invention.

The laminated glazing unit in FIG. 1 comprises a first glass sheet 1 with a first main face 11, a second main face 12, and an edge face 13 via which an LED 42 supported by a PCB 41 injects light into the first sheet. The lamination interlayer 3 making adhesive contact with the first main surface 21 of the second sheet and the second main surface 12 of the first sheet has a smaller extent than the two glass sheets 1, 2 and thus defines a groove-shaped space between these two sheets. The emitting surface 31 of the LED 42 is optically coupled to the edge face 13 of the first sheet by a transparent adhesive 15. The PCB 41 is adhesively bonded directly to the first main surface of the second sheet. The encapsulating element 4 makes contact with the edge face 23 of the second sheet, the PCB, the LED 42, the adhesive 15, and the first main surface 11 of the first sheet.

The encapsulating element 4 making contact with the first main face 11 of the first sheet blocks any parasitic light liable to be emitted toward the interior.

An opaque enamel 18 applied to the first main face 21 of the second sheet masks this zone of contact between the PCB and the sheet 2 with respect to the exterior. The combined blocking power of this enamel 18 and of the PCB 41 is sufficient to block the emission of direct light from the LED toward the exterior. However, beyond the PCB 41, the blocking power of the enamel alone is insufficient to screen the parasitic light.

FIG. 2 shows the negative of a photograph, taken with a video photometer, of the glazing unit in FIG. 1 seen from the exterior. Each dark spot in this figure corresponds to a spot of parasitic light, from an LED, having passed through the enamel 18.

FIG. 3 shows a first embodiment of a glazing unit according to the present invention. Comparison with FIG. 1 shows that one of the ways in which this glazing unit differs from that in FIG. 1 is that an opaque layer 6 is present. This opaque layer 6 is printed onto that face of the lamination interlayer 3 which makes adhesive contact with the first main face 21 of the second sheet 2. This layer extends from the edge, or from the edge face 33, of the interlayer 3 as far as the edge of the enamel layer 18, thus preventing light emitted by the LED 42 from passing through the enamel layer 18 and being seen from the exterior. The glazing unit in FIG. 3 furthermore differs from the prior art shown in FIG. 1 in that the PCB 41 makes contact with the interlayer 3 and the layer 6, thus ensuring the continuity of a screen screening off the parasitic light.

FIG. 4 shows an example of a lamination interlayer according to the invention. This interlayer 3 comprises, on two opposite edges, two opaque printed bands 6 of length L and of width l.

In FIG. 5, the opaque layer 6 takes the form of a single peripheral band of uniform width l, bordering the interlayer 6 like a frame.

The invention claimed is:

1. A laminated illuminating glazing unit, comprising:
    a first sheet, made of mineral or organic glass, with a first main face, a second main face and an edge face;
    a second sheet, made of mineral or organic glass, with a first main face, a second main face and an edge face;
    a transparent lamination interlayer making adhesive contact with the second main face of the first sheet and with the first main face of the second sheet, the transparent lamination interlayer being made of polyvinyl butyral (PVB), of thermoplastic polyurethane (TPU), or of ethylene vinyl acetate copolymer (EVA);
    at least one strip of light-emitting diodes, comprising a printed circuit board and a plurality of light-emitting diodes having emitting faces, positioned so that the emitting faces of the light-emitting diodes face the edge face of the first sheet; and
    one or more scattering elements for scattering light emitted by the plurality of light-emitting diodes,
    wherein the transparent lamination interlayer comprises an opaque masking layer printed on at least one of its main faces so that the opaque masking layer does not extend outside of the boundary of the transparent lamination interlayer, said opaque masking layer extending from an edge of the transparent lamination interlayer toward a center of the glazing unit so as to cover a zone in which the light from the plurality of light-emitting diodes would, in the absence of said opaque masking layer, be visible, in the form of luminous halos, through the second sheet.

2. The laminated glazing unit as claimed in claim 1, wherein the opaque masking layer printed on at least one of the main faces of the lamination interlayer is a layer that absorbs light, a layer that reflects light, or a layer that absorbs and reflects light.

3. The laminated glazing unit as claimed in claim 1, wherein the opaque masking layer printed on at least one of the main faces of the lamination interlayer is a metal layer.

4. The laminated glazing unit as claimed in claim 3, wherein the metal layer is a silver layer.

5. The laminated glazing unit as claimed in claim 1, wherein the second sheet is larger than the first sheet, and wherein the at least one strip of light-emitting diodes is fixed, by way of the printed circuit board, to the first main face of the second sheet in a zone where the second sheet extends beyond the first sheet.

6. The laminated glazing unit as claimed in claim 5, wherein one edge of the printed circuit board makes contact with the edge of the transparent lamination interlayer.

7. The laminated glazing unit as claimed in claim 1, wherein the second sheet comprises, on its first main face, an opaque enamel layer extending from the edge of the second sheet toward the center of the glazing unit.

8. The laminated glazing unit as claimed in claim 7, wherein the opaque enamel layer extends at least as far as a limit of the opaque masking layer printed on at least one of the main faces of the transparent lamination interlayer making contact with the first main face of the second sheet.

9. The laminated glazing unit as claimed in claim 7, wherein the opaque masking layer is in contact with the enamel layer.

10. The laminated glazing unit as claimed in claim 9, wherein the enamel layer extends outside of the boundary of the transparent lamination interlayer.

11. The laminated glazing unit as claimed in claim 7, wherein the enamel layer extends outside of the boundary of the transparent lamination interlayer.

12. The laminated glazing unit as claimed in claim 1, further comprising an encapsulating element making contact at least with the edge face of the second sheet and with the first main face of the first sheet.

13. The laminated glazing unit as claimed in claim 1, wherein the opaque masking layer is printed on at least one of the main faces of the transparent lamination interlayer which makes adhesive contact with the first main face of the second sheet.

14. The laminated glazing unit as claimed in claim 1, wherein the transparent lamination interlayer has a smaller extent than that of each of the first and second sheets, thus defining a groove-shaped space between the edge of the second main face of the first sheet and the edge of the first main face of the second sheet, the printed circuit board being inserted into the groove-shaped space and bearing against the first main face of the second glass sheet, one edge of the printed circuit board making contact with the edge of the transparent lamination interlayer.

15. The laminated glazing unit as claimed in claim 1, wherein the one or more scattering elements are located on one of the first and second main faces of the first sheet or in a thickness of the first sheet.

16. The laminated glazing unit as claimed in claim 1, wherein the laminated glazing unit is a vehicle glazing unit or a building glazing unit.

17. The laminated glazing unit as claimed in claim 1, wherein the first main face of the first sheet defines a first external main face of the laminated glazing unit and the second main face of the second sheet defines a second external main face of the laminated glazing unit.

18. The laminated glazing unit as claimed in claim 1, wherein the laminated glazing unit is transparent.

19. The laminated glazing unit as claimed in claim 1, wherein each of the first and second sheets is a monolithic glass sheet.

* * * * *